United States Patent
Young et al.

(10) Patent No.: US 12,532,186 B2
(45) Date of Patent: Jan. 20, 2026

(54) AUTOMATIC DETECTION AND REPORTING FOR DEPLOYABLE CELL SITES

(71) Applicant: AT&T Mobility II LLC, Atlanta, GA (US)

(72) Inventors: Jason Young, Buford, GA (US); Muhammed Abughrara, Aldie, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 558 days.

(21) Appl. No.: 17/973,777

(22) Filed: Oct. 26, 2022

(65) Prior Publication Data

US 2024/0147250 A1  May 2, 2024

(51) Int. Cl.
*H04W 16/18* (2009.01)
*H04W 24/02* (2009.01)

(52) U.S. Cl.
CPC .......... *H04W 16/18* (2013.01); *H04W 24/02* (2013.01)

(58) Field of Classification Search
CPC ...... H04W 16/18; H04W 24/02; H04W 24/08
See application file for complete search history.

(56) References Cited

U.S. PATENT DOCUMENTS

| | | | |
|---|---|---|---|
| 10,531,421 B1* | 1/2020 | Osinski | H04W 4/90 |
| 11,153,765 B1* | 10/2021 | Jat | H04W 24/08 |
| 2010/0120394 A1* | 5/2010 | Mia | H04W 64/003 455/436 |
| 2017/0188254 A1* | 6/2017 | Shaul | H04W 24/10 |
| 2020/0178085 A1* | 6/2020 | Ertimo | H04W 24/10 |
| 2024/0039801 A1* | 2/2024 | Pathak | H04L 41/5009 |
| 2024/0160835 A1* | 5/2024 | Trivedi | G06F 3/0482 |

OTHER PUBLICATIONS

"Carrier IQ", Wikiepedia, Oct. 25, 2022 (Year: 2022).*
"Carrier IQ", Wikipedia, https://en.wikipedia.org/wiki/Carrier_IQ, 12 pp, Oct. 25, 2022.

* cited by examiner

*Primary Examiner* — Ayaz R Sheikh
*Assistant Examiner* — David Zhijun Sun
(74) *Attorney, Agent, or Firm* — Guntin & Gust, PLC; Daniel P. Williams

(57) ABSTRACT

Aspects of the subject disclosure may include, for example, accessing device usage data that can be generated when end user devices connect with the network; and analyzing the device usage data according to identification information of the deployable cell site, which enables determining or estimating a location of the deployable cell site. In one embodiment, this analysis can be based on device usage reports and network performance data. A performance report and/or location map can be generated for an area associated with the deployable cell site. Other embodiments are disclosed.

20 Claims, 10 Drawing Sheets

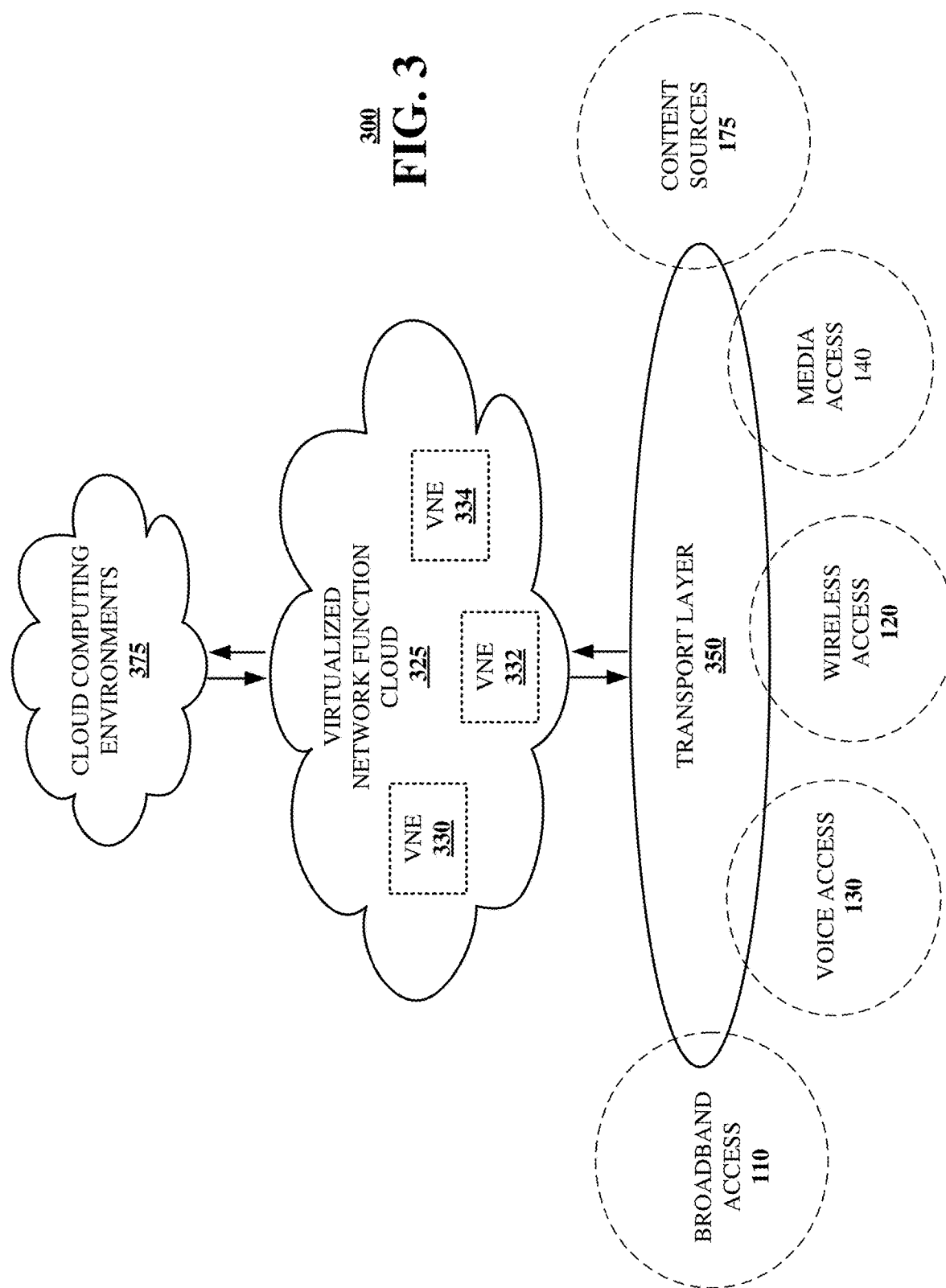

AUTOMATIC DETECTION AND REPORTING FOR DEPLOYABLE CELL SITES

FIELD OF THE DISCLOSURE

The subject disclosure relates to automatic detection and reporting for deployable cell sites.

BACKGROUND

A deployable cell site is a non-permanent, non-fixed network asset, which can be placed into service by communication service providers in a short period of time. Deployable cell sites are sometimes used to provide temporary coverage to an area of a communication network, such as where a disaster has struck. The deployable cell sites may be activated in a short period of time. Rapid and unpredictable activation of deployable cell sites, particularly where the deployable cell sites are under the control of third parties other than the communication service provider, can place a strain on the communication service provider's network management systems. This strain can occur during initial deployment, as well as at and after the time that the deployable cell site is deactivated.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
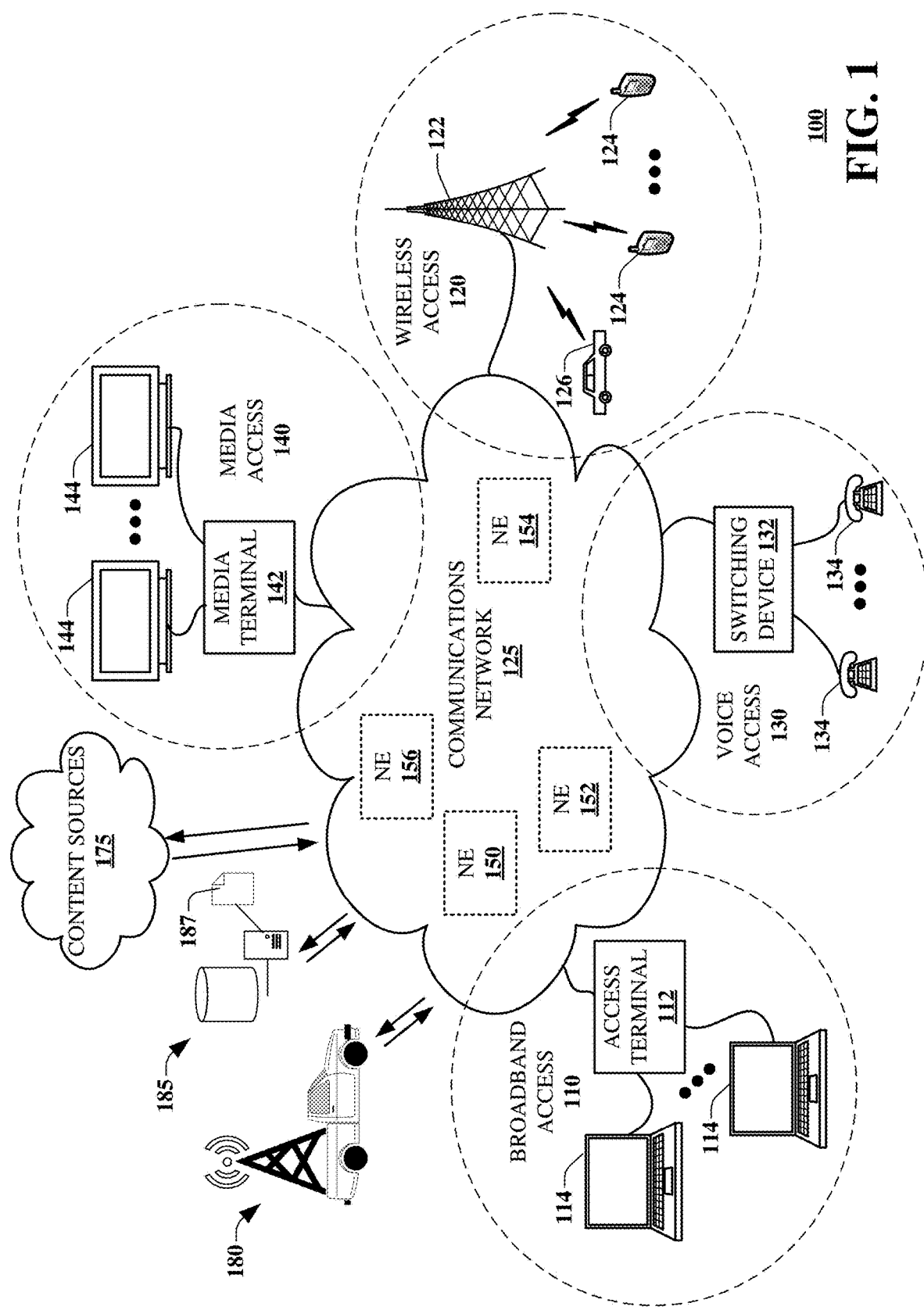
FIG. 1 is a block diagram illustrating an exemplary, non-limiting embodiment of a communications network in accordance with various aspects described herein.

The subject disclosure describes, among other things, illustrative embodiments of automated detection and/or reporting of performance and configuration for deployable cell sites. The deployable cell sites can be of various types such as a Compact Rapid Deployable (CRD), Cell on Wheels (COW), Cell on Light Truck (COLT) or other deployable cell sites that can be transported to a location of need and support network services, including operating as a radio base station for the area in which it has been deployed. The deployable cell sites can be owned and/or operated by various entities including first responder entities on the FirstNet network. Other owners and/or operators of the deployable cell sites can include third parties that are different entities from one or more communication service providers (e.g., a building owner that is facilitating services to its building, a venue owner that is increasing service capability at its venue, a contractor that is brought in to provide service (or increase service) to a particular area, and so forth) and/or a communication service provider(s) that utilizes deployable cell site(s) to temporarily provide service or increase service to a particular area(s).

In one or more embodiments, a detection or determination can be made (e.g., by a network server) as to when a deployable cell site(s) is activated (or otherwise providing or facilitating communication services to end user devices), and a location for the active deployable cell site(s) can then be discerned, estimated or otherwise determined. In one or more embodiments, configuration settings can be validated for the deployable cell site(s). In one or more embodiments, performance KPIs can be obtained and provided to particular recipients, such as a fixed group of email recipients. In one embodiment, the performance KPIs can be provided for as long as the deployable cell site is powered up and active. In other embodiments, the performance KPIs can be provided even after the deployable cell site is powered down and/or made inactive, such as for a particular period after being made inactive. In one embodiment, the same group of recipients (or a subset thereof) can be notified as to when the deployable cell site has been inactive for a preset period of time. In one or more embodiments, "last known location" of deployable cell sites can be stored and/or presented, such as in a GIS interface.

In one or more embodiments, a service provider can be a partner for communications solutions for emergency responders, such as the FirstNet Authority, and can utilize one or more of the exemplary embodiments to facilitate providing and/or managing communication services. For example, emergency responder agencies or entities can purchase or otherwise obtain temporary, rapidly-deployable cell sites from a communication service provider. As another example, these devices can satisfy or supplement short-duration coverage and capacity demands. In one or more embodiments, the deployable cell sites are not under the control and/or management of a communication service provider that provides services over a network in the particular area, and where and when the deployable cell sites are activated may be outside of the control (and/or knowledge) of the communication service provider.

In one or more embodiments, the deployable cell sites can be provisioned onto a network of the communication service provider(s) (e.g., at a time of purchase) but then they may go unused or otherwise be inactive for periods of time, such as sitting in a storage room, parked in a secure lot, or awaiting an event for activation. But when there is an event or other cause for activation (e.g., an emergency in an area where commercial network coverage is poor or supplemental coverage is desired, a commercial cellular system fails, a concert or otherwise high-participation event is occurring), the deployable cell sites can be activated. In some embodiments, the deployable cell sites can be moved into position and activated in short periods of time, such as within a few hours. In other embodiments, the deployable cell sites can be moved into position ahead of time and then activated when needed or desired, such as for a scheduled event, a storm whose track is predicted, and so forth.

Rapid and unpredictable deployment of deployable cell sites can place a strain on a communication service provider's network management systems. This can be particularly so where the deployable cell sites are owned or managed by third parties that are different from the communication service provider. Communication service providers often operate under an assumption that systems are deployed for consistent or permanent operation. When deployable cell sites disappear or are otherwise inactivated from the network, this can generate an alarm at the communication service provider and can be detected as, or otherwise characterized to be, an outage, whereby technicians of the communication service provider may be deployed to restore operation and/or other procedures may be initiated to mitigate the perceived outage. One or more of the exemplary embodiments can facilitate or improve efficiency and accuracy in network management, such as where one or more deployable cell sites are being operated by third parties that are different from the communication service provider, including improving efficiency and accuracy in Performance Management (PM) functions and/or Configuration Management (CM). In one or more embodiments, efficiency and accuracy can be improved in Fault Management (FM) functions for a communication service provider. In one or more embodiments, the techniques and devices described herein can be used in PM function, CM functions and/or FM functions such as across some or all network resources or assets which can include the deployable cell sites and can include other equipment such as fixed cell sites.

In one or more embodiments, a report/output delivery can be done via an APP fed by an API to an end user device, such as a smart phone. In this example, a user can observe in real time where their assets are and how they are performing (e.g., active/payload, call volume per hour, KPIs or other related information).

One or more embodiments provide an improvement over systems whereby PM data must be manually pulled after a request is received from a governing authority, which may be in the form of a complaint about performance during an emergency. In one or more embodiments, the efficiency (e.g., speed, accuracy, and so forth) of analysis of network performance information such as at or near an event (e.g., a scheduled venue, disaster, emergency, detected network conditions below a particular threshold in a particular area, and so forth) can be improved.

In one or more embodiments, the data or information representative of the data (e.g., summaries, graphs, derivative data, and so forth) can be efficiently and effectively provided to individuals (e.g., market engineers, first responder supervisors, etc.) and/or to other equipment (e.g., analytics platform, Network Data Analytics Functions (NWDAF), third party analysis devices, Machine Learning/Artificial Intelligence (ML/AI) servers, etc.). This data or information representative of the data can be used to support, adjust and/or improve the network performance, such as enabling market engineers to correct a detected, estimated or perceived issue, underperformance and/or fault proactively and/or enabling account support personnel to communicate with the customer(s) before the customer reaches out to the service provider regarding the issue.

In one or more embodiments, a location of a deployable cell site can be determined based on a coverage region of traffic served. As an example, device usage data (e.g., reports) can be utilized to determine or estimate the location of the deployable cell site. In one or more embodiments, the device usage data and network timing data can be utilized for determining or estimating the deployable cell site location. In one or more embodiments, the deployable cell site location can be affixed, stored, and/or charted over time.

In one or more embodiments, the device usage data can be obtained based on consent of the user, such as an opt-in/opt-out authorization. In one or more embodiments, a user can select a particular authorized use for the device usage data.

In one or more embodiments, network location information can be collected from cellular towers and deployable cell sites that are used in a wireless network. Data collected by other, permanent cell sites with fixed/known locations, for use by self-tuning and self-optimizing features such as Automatic Neighbor Relations (ANR) may be used to assist in the calculation of the specific location of the newly-activated deployable.

In one or more embodiments, software (e.g., embedded in firmware of end user devices such as by original equipment manufacturers) can collect or otherwise facilitate the collection of device diagnostic and/or location data such as when the device powers on and/or contacts a new cell tower. In one or more embodiments, the software(s) on the end user device can be developed and/or owned by the communication service provider(s). In one embodiment, this functionality is opted into by a user, and is not passive in a background of the device from the factory but rather needs to be enabled.

In one or more embodiments, the device usage data can be utilized by the communication service provider to improve network performance and/or for customer service purposes. In one or more embodiments, the device usage data can be utilized to identify areas where a communication service provider needs to enhance network coverage and/or to make adjustments to the network to improve performance. In one or more embodiments, the communication service provider does not share the device usage data (unless legally required to do so), and the communication service provider does not utilize the device usage data for advertising purposes. In one embodiment, the device usage data is only utilized to improve performance of the network and thus benefit the user at no additional cost to them.

In one or more embodiments, the deployable cell site(s) can have identification information which can be utilized for determining or estimating its location when it is activated for providing communication services to end user devices. As an example, the deployable cell site can have a USID and/or cell identifier data (or other identifying information) which can be known by a communication service provider at a time of provisioning. This information can enable or facilitate automation of detection of the deployable cell site and/or generating and reporting of performance information related to the deployable cell site and/or the area in which the deployable cell site is operating.

In one or more embodiments, software workers or code in the background can search for sessions on deployable radios and can categorize the activity of the deployable cell site such as 'dormant' or 'active'.

In one or more embodiments, the activation of a deployable cell site can be detected without new data needing to be manually entered. In one or more embodiments, the date and time range for reporting performance information associated with the deployable cell site can be automatically calculated.

In one or more embodiments, the techniques described herein can be applied to various short-duration deployments of deployable cell sites, including traditional event-supporting COWs. In one or more embodiments, the techniques described herein can be applied to monitor customer self-install devices which operate on a communication service provider's network. Other embodiments are described in the subject disclosure.

One or more aspects of the subject disclosure include a device operated by a first entity, comprising: a processing system including a processor; and a memory that stores executable instructions that, when executed by the processing system, facilitate performance of operations. The operations include storing identification information for a deployable cell site that is operated by a second entity; and detecting that the deployable cell site has become active. The operations include accessing device usage reports that are generated from device usage data when end user devices connect with a network; and performing an analysis of the device usage reports according to the identification information. The operations include determining a location of the deployable cell site based on the analysis of the device usage reports and network performance data. The operations include generating a performance report and location map for an area associated with the deployable cell site.

One or more aspects of the subject disclosure include a method, comprising: receiving, by a processing system including a processor, a performance report and/or location map for an area of a network associated with a deployable cell site operated by a second entity, where the performance report and/or the location map are received from a network server of the network operated by a first entity, where the performance report and/or the location map are generated according to an identification of a location of the deployable cell site based on an analysis of device usage reports and network performance data, where the device usage reports are generated from device usage data when end user devices connect with the network. The method includes presenting, by the processing system, the performance report and/or the location map.

One or more aspects of the subject disclosure include a non-transitory machine-readable medium, comprising executable instructions that, when executed by a processing system including a processor operated by a first entity, facilitate performance of operations. The operations include accessing device usage reports that are generated from device usage data when end user devices connect with a network. The operations include performing an analysis of device usage reports according to identification information for a deployable cell site that is operated by a second entity. The operations include determining a location of the deployable cell site based on the analysis of the device usage reports and network performance data. The operations include generating a performance report and/or location map for an area associated with the deployable cell site.

Referring now to FIG. 1, a block diagram is shown illustrating an example, non-limiting embodiment of a system 100 in accordance with various aspects described herein. System 100 can include one or more deployable cell sites 180 (only one of which is shown) which can be various types including CRD, COW, COLT or other deployable cell sites that can be moved into a particular position and support network services, and which can be owned and/or operated by various entities including first responder entities (e.g., on the FirstNet network), the communication service provider of network 125 and/or third parties that are different entities from the communication service provider (e.g., a building owner, a venue owner, a contractor that provides service (or increased service) to a particular area, and so forth). Deployable cell sites 180 can include various devices or components that enable or otherwise facilitate particular communication services, such as cellular radio(s) and/or WiFi component(s). The deployable cell sites 180 can operate utilizing various Radio Access Technologies (RATs) including one or more of LTE, 5G, 6G, NG, WiFi, Ethernet access (e.g., via a plug into an Ethernet cable, fiber, copper wire, etc.), and so forth. In one or more embodiments, the deployable cell sites 180 can be multi-RAT cell sites. In one or more embodiments, the deployable cell sites 180 can provide full communication services or limited communication services. As an example, a first group of devices may be authorized to access cellular communication services while a second group of devices is authorized to access WiFi Internet services. In another embodiment, only particular devices that are associated with an entity operating the deployable cell site 180 can access communication services such as cellular communication services and WiFi services.

System 100 can include a network server 185 or other equipment or functionality (including virtual functionality) that facilitates locating one, some, or all of the deployable cell sites 180 when they become active, such as when they are powered up and begin operating as a cell site and/or WiFi hotspot. In one or more embodiments, the network server 185 can be operated by a communication service provider that operates the network 125, which may or may not be different from the entity operating the deployable cell site 180. In one or more embodiments, the network server 185 can monitor and track the deployable cell site locations (or otherwise store known locations and time periods at those locations), such as for deployable cell sites that are being operated by a third party that is different from the communication service provider operating the network 125. The network server 185 can be located at various places in the network including in the Core, in edge server(s), in the Cloud, and so forth.

System 100 can facilitate in whole or in part accessing device usage data that can be generated when end user devices connect with the network 125. The device usage data can include measurements made by the end user device (e.g., mobile phone) that indicate something about the quality of the network at that specific point of space and time. For example, the device usage data can include RSRP, RSRQ, and SNR. The device usage data can also indicate the serving sector and the frequency band.

In one or more embodiments, the device usage data can be obtained via software running in the background on the end user devices and can be stored in chunks. As an example, periodically the chunks can be uploaded to the network in bursts which the users are not charged for.

The network server 180 can analyze the device usage data according to identification information of the deployable cell site 180, which enables determining or estimating a location of the deployable cell site. In one embodiment, this analysis can be based on device usage reports and network performance data. A performance report and/or location map 187 can be generated for an area associated with the deployable cell site 180. In one embodiment, the network performance data can include Received Signal Strength Indicator (RSSI) data. In another embodiment, the determining of the location of the deployable cell site can be based on triangulation, although other technique can be utilized. In one embodiment, the network server 185 can transmit the performance report and/or location map 187 to a group of communication devices that is operated by the entity operating the deployable cell site 180. In one embodiment, the transmitting of the performance report and/or the location map 187 includes providing access to a graphical user interface that enables selection of a time period and cell sites for generating a revised performance report 187.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
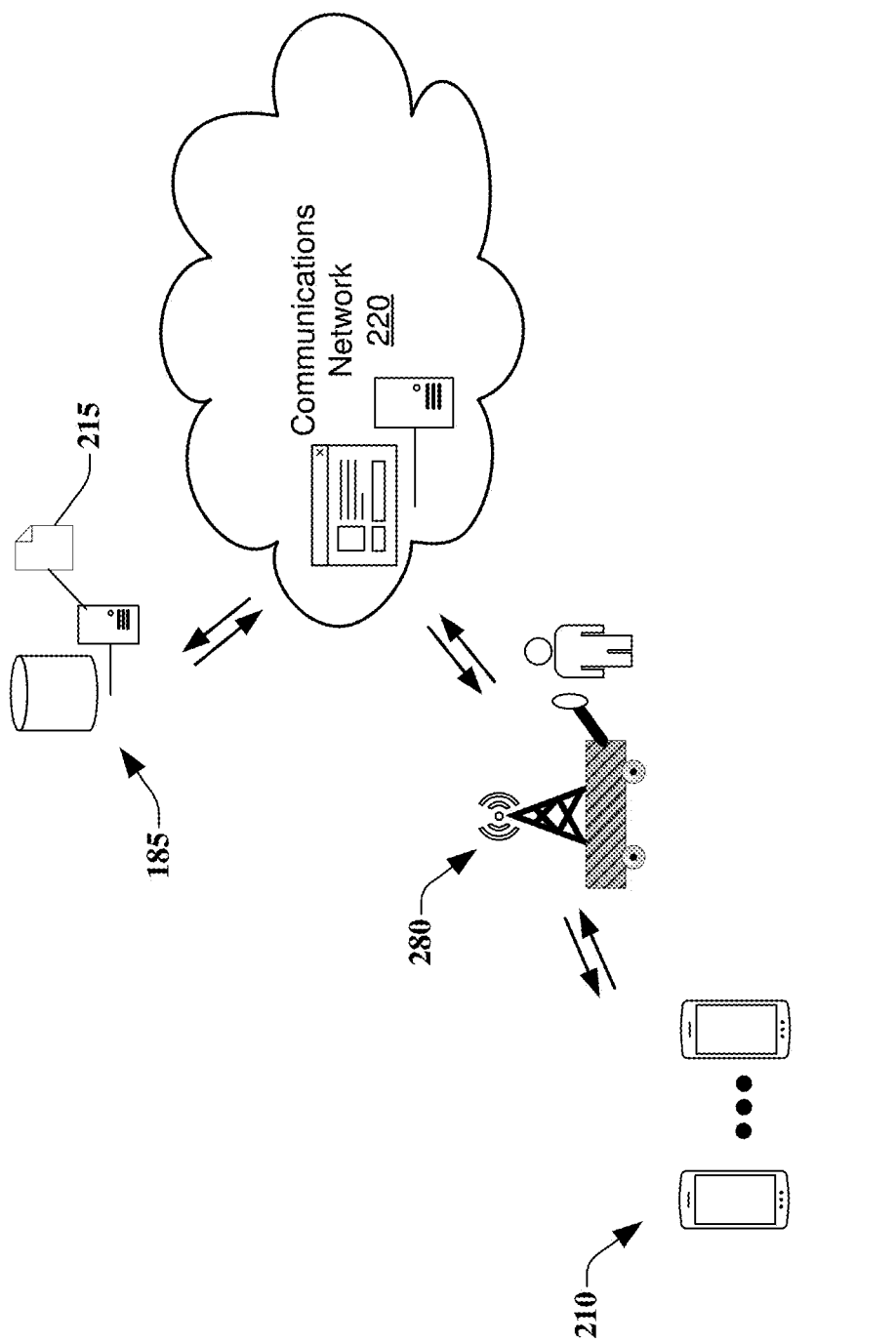
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 can include one or more deployable cell sites 280 (only one of which is shown) which is illustrated as a CRD, but can be other types including COW, COLT or other deployable cell sites that can be moved into a particular position and support network services, and which can be owned and/or operated by various entities including first responder entities (e.g., on the FirstNet network), the communication service provider of network 220 and/or third parties that are different entities from the communication service provider. Deployable cell sites 280 can include various devices or components that enable or otherwise facilitate particular communication services, such as cellular radio(s) and/or WiFi component(s). In one or more embodiments, the deployable cell sites 280 can provide full communication services or limited communication services.

System 200 can include a network server 185 or other equipment or functionality (including virtual functionality) that facilitates locating one, some, or all of the deployable cell sites 280 when they become active, such as when they are powered up and begin operating as a cell site and/or WiFi hotspot. In one or more embodiments, the network server 185 can be operated by a communication service provider that operates the network 220 which may or may not be different from the entity operating the deployable cell site 280. In one or more embodiments, the network server 185 can monitor and track the deployable cell site locations (or otherwise store known locations and time periods at those locations), such as for deployable cell sites that are being operated by a third party that is different from the communication service provider operating the network 220, and can generate performance reports and/or location maps 215.

System 100 can facilitate in whole or in part registering (e.g., via network server 185) identification information of the deployable cell site 280 such as USID, CellID, Physical CellID (PCI), or other identification information that is assigned to the deployable cell site. In one embodiment, the deployable cell site 280 can operate on band 14. In one embodiment, the deployable cell site 280 can have one or more radios that are each provisioned with Radio Frequency Distribution System (RFDS) and RNDCIQ data.

In one embodiment, the network server 185 can build or otherwise assign software workers that monitor network KPIs to detect whether the deployable cell site 280 has become active. In one embodiment, when the network server 185 detects that the deployable cell site 280 has become active, the network server 185 analyzes or otherwise searches through device usage reports (e.g., reports from data/information obtained by software on the end user device or otherwise obtained) according to identification information of the deployable cell site (e.g., cellID). In one embodiment, the network server 185 can analyze the usage data and network KPIs to determine or estimate a location of the deployable cell site 280, such as through use of triangulation applied to longitude/latitude device usage data of end user devices 210 that are connecting via the deployable cell site and/or RSSI data of the end user device connections to the deployable cell site.

In one embodiment, the network server 185 can generate and/or distribute performance reports and/or location maps 215 that are associated with communication services provided via the deployable cell site 280. As an example, communication devices can be on a distribution list (e.g., an email list) for receiving performance reports and/or location maps 215. These communication devices can be operated or owned by various entities or individuals including FN ROG, market RAN, national support teams, the entity operating the deployable cell site 280 and so forth.

In one or more embodiments, the deployable cell site 280 can be a CRD that is a customer owned deployable cell tower. For example, the CRD can be owned and operated by an emergency responder agency, such as a FirstNet agency. In one or more embodiments, the CRD can generate an area of cellular (e.g., FirstNet Cellular) and WiFi Internet coverage. For example, the CRD can include a cellular range of one mile (although larger or smaller coverage areas can be provided); a WiFi range of up to one thousand feet (although larger or smaller coverage areas can be provided); internet (e.g., which can be based on or limited by the speed of the satellite backhaul); a power source (e.g., a generator of a particular run time such as sixty hours although longer or smaller run times can be provided); weatherproof and waterproof housing; mobility mechanisms such as wheels, hitch, cargo carrier, push/pull handle, or combinations thereof.

In one or more embodiments, the CRD can operate as a fully functional COW (which may or may not be directed to services for emergency responders); operate as a fully functional FirstNet COW; connect to the cloud; be deployable by a single person; or any combination thereof. In one or more embodiments, the CRD can be activated to provide services for various situations including an emergency response, remote Internet connectivity, business continuity/recovery, restoring Internet service, supply Internet to other units, support VoIP, RoIP and/or IoT, backup for PSAP and/or dispatch. In one or more embodiments, the CRD can provide connectivity (e.g., FirstNet connectivity) when and where a communication service provider's cellular coverage is unavailable (or is limited or there is otherwise a desire to supplement coverage) which can be caused by various events including a lack of coverage in a remote area, an outage, a disaster, a scheduled event (e.g., a concert, a sporting event, equipment maintenance) and so forth. In one or more embodiments, the CRD can provide Internet via WiFi and/or Ethernet cable. In one or more embodiments, the CRD is owned and operated by a primary or extended-primary FirstNet customer. In one or more embodiments, the CRD has a size, shape and weight that enables storage indoors and transportation by a single person with no lifting required to mount or dismount the CRD. In one or more embodiments, the CRD has a size, shape and weight that enables towing via a trailer hitch.

In one or more embodiments, the CRD can fit through a doorway and onto elevators. In one or more embodiments, the CRD can be transported via a trailer hitch without the need for lifting or heavy equipment to position the CRD. In one or more embodiments, the CRD can include a raising and lowering mechanism, such as a scissor lift crank, which can facilitate connection to a tow vehicle. In one or more embodiments, the CRD can include a high-speed auto-acquire Ka-band satellite terminal; a weatherproof NEMA enclosure; a FirstNet Band 14 cellular radio; a satellite modem; a satellite controller; a cradlepoint router; an A/C and heater system; a power control module; stabilizers; high-gain LTE cellular antennas; a mast for the antennas; a WiFi/LTE cellular antenna suite; a generator (e.g., 2200 W gas/diesel powered) and fuel tank; or any combination thereof.

In one or more embodiments, the size, shape, weight and mobility of the CRD allows it to be moved into position in an efficient manner by various methods including towed behind a vehicle, air-lifted in by helicopter, pushed/pulled by a single person, and so forth.

Figure 2B:
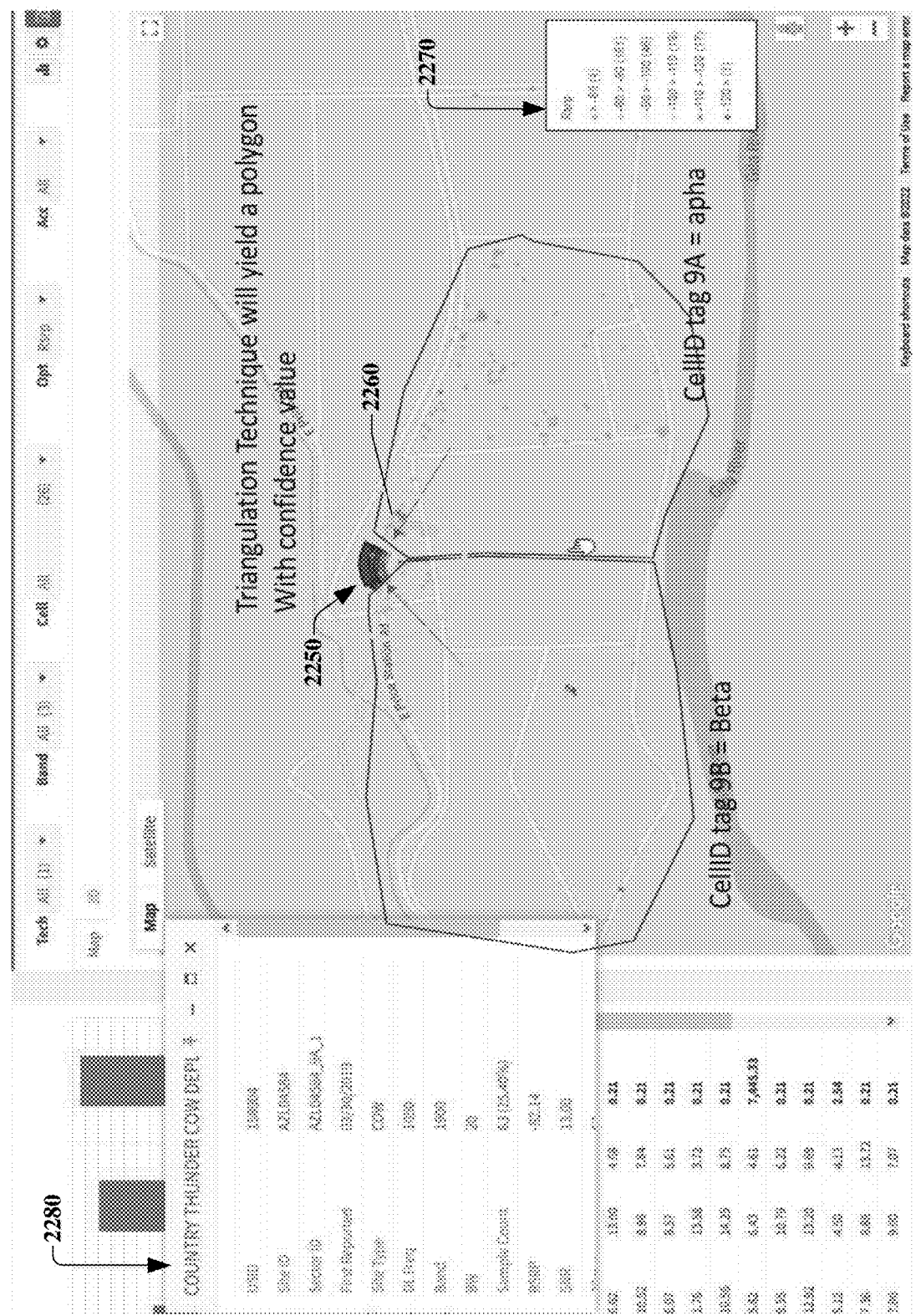
FIG. 2B is a block diagram illustrating an example, non-limiting embodiment of information generated by a system functioning within the communication network of FIG. 1 in accordance with various aspects described herein.

FIG. 2B is a sample illustration of a GUI or information/graphics 225 that can be generated/distributed by server 185 (or other devices/functionality as described herein) which includes a map showing a calculated location for a deployable cell site 2250. As an example, the deployable cell site location 2250 can be calculated according to device usage reports generated by end user devices which are represented as circles 2260. In one or more embodiments, the circles 2260 can be of different colors (or other indicia) which represent an amount (or strength) of a particular parameter, such as RSSI ranges shown in legend 2270.

In one embodiment, the device usage data (e.g., end user device longitude and latitude data) and network performance data (e.g., RSSI) enables triangulation to be performed to yield a polygon with confidence value that is representative of the location of the deployable cell site. Various other data is illustrated in legend 2280 of information/graphics 225 such as the particular named event, identification for the deployable cell site, type of cell site, frequency, band, bandwidth, average RSRP (RSSI), average SNR, and so forth.

In one or more embodiments, the information/graphics 225 can be device usage data (e.g., data/information obtained by software on the end user device or otherwise obtained) on a certain date at a certain time in a certain area where the device usage data is derived from the end user devices. In one embodiment, a user opts into providing the device usage data and it remains privacy-protected such that the phone number of any of these users remains anonymous to the collection and analysis process. The device usage data can include various parameters such as signal strength, interference levels and so forth.

In one or more embodiments, when a location of a deployable cell site is determined, a pin can be placed in a GUI and the system will create a service area polygon based on the location of the reporting user devices. The system will pull the expected beamwidth of the antenna from system configuration files. The collected device usage data can include illustrating end user devices talking to a particular cell site and the particular activity that occurred, along with the latitude and longitude of each of the end user devices.

In one or more embodiments, the circles 2260 can be mapped to the site to obtain a footprint of the coverage area as shown by information/graphics 225.

Figure 2C:
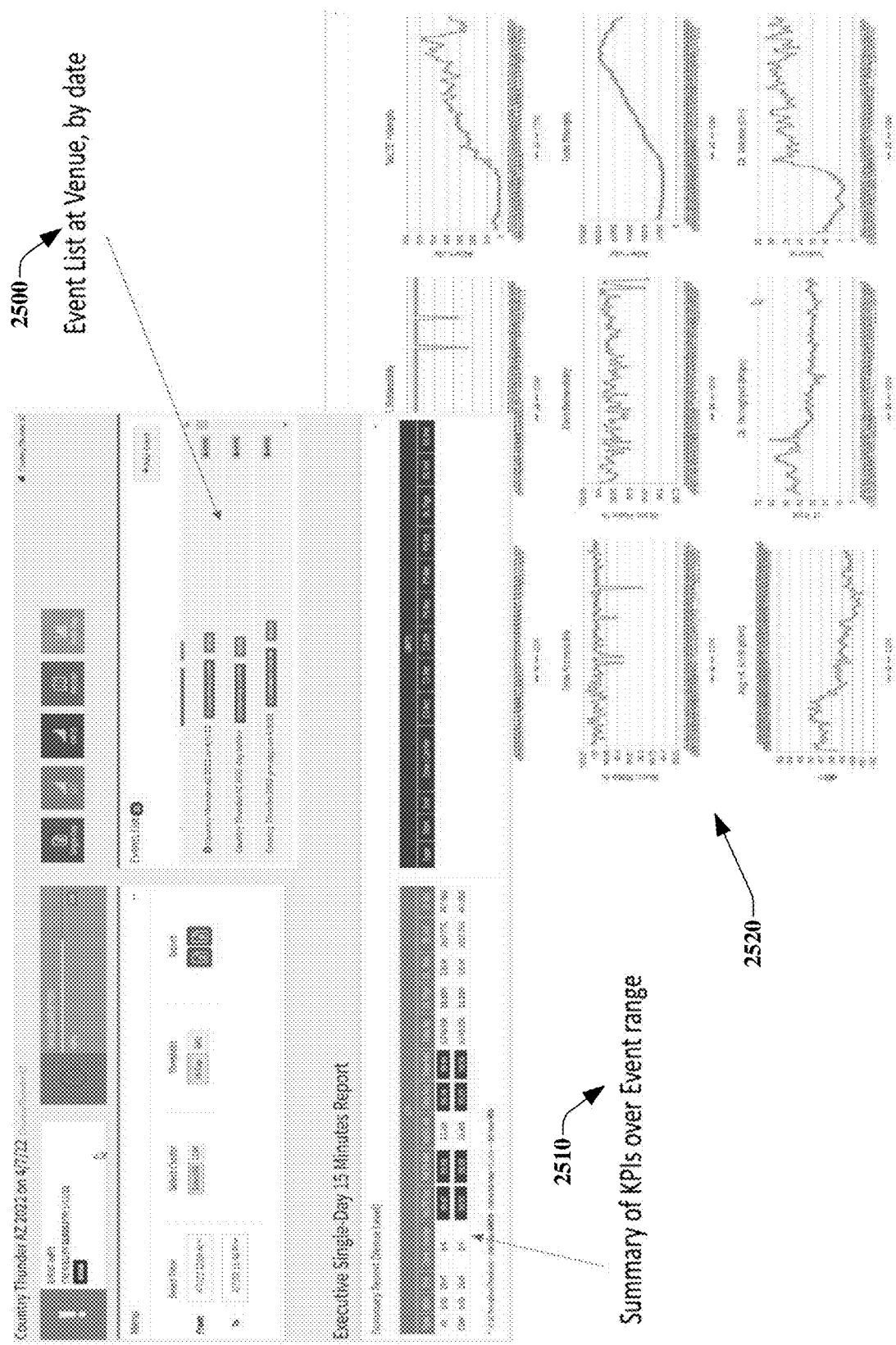
FIG. 2C is a block diagram illustrating an example, non-limiting embodiment of information generated by a system functioning within the communication network of FIG. 1 in accordance with various aspects described herein.

FIG. 2C is a block diagram of a GUI 250 illustrating performance data that can be generated by server 185 (or other devices/functionality as described herein) for a particular area that is associated with a deployable cell site. As an example, the performance data 250 can be associated with a particular event and/or time frame selected via a button of the event list 2500. Various KPIs can be viewed and/or analyzed over various dates, and a summary 2510 of the KPIs over an event range can be illustrated. Various graphs 2520 or other graphical illustrations of data can be presented, which can be selected by a user.

In one embodiment, GUI 250 can be a report for different days and/or different time periods. In one embodiment, GUI 250 enables aggregating multiple days of reports into a single report. In one embodiment, GUI 250 provides various buttons that enable a user to select particular data and other variables for the report.

In one embodiment, GUI 250 enables viewing performance data for different layers of the network which can be defined in different ways such as a separate line for Distributed Antenna System (DAS), a separate line for macro base station, a separate line for COW deployable cell site, a separate line for CRD deployable cell site, and so forth.

In one embodiment, GUI 250 provides different buttons for filtering quickly on different parts of the network, which can include viewing DAS separate from the macro base station, separate from the COW, separate from the CDR, and so forth. In one embodiment, GUI 250 provides a button for combining these different parts of the network together, which can trigger presenting charts 2520.

In one embodiment, GUI 250 enables a user to define these clusters and all of the clusters can be included in the report. In one embodiment, GUI 250 provides a link that allows a recipient of the report to access GUI 250 so that the recipient can actively select and filter the data as desired.

Figure 2D:
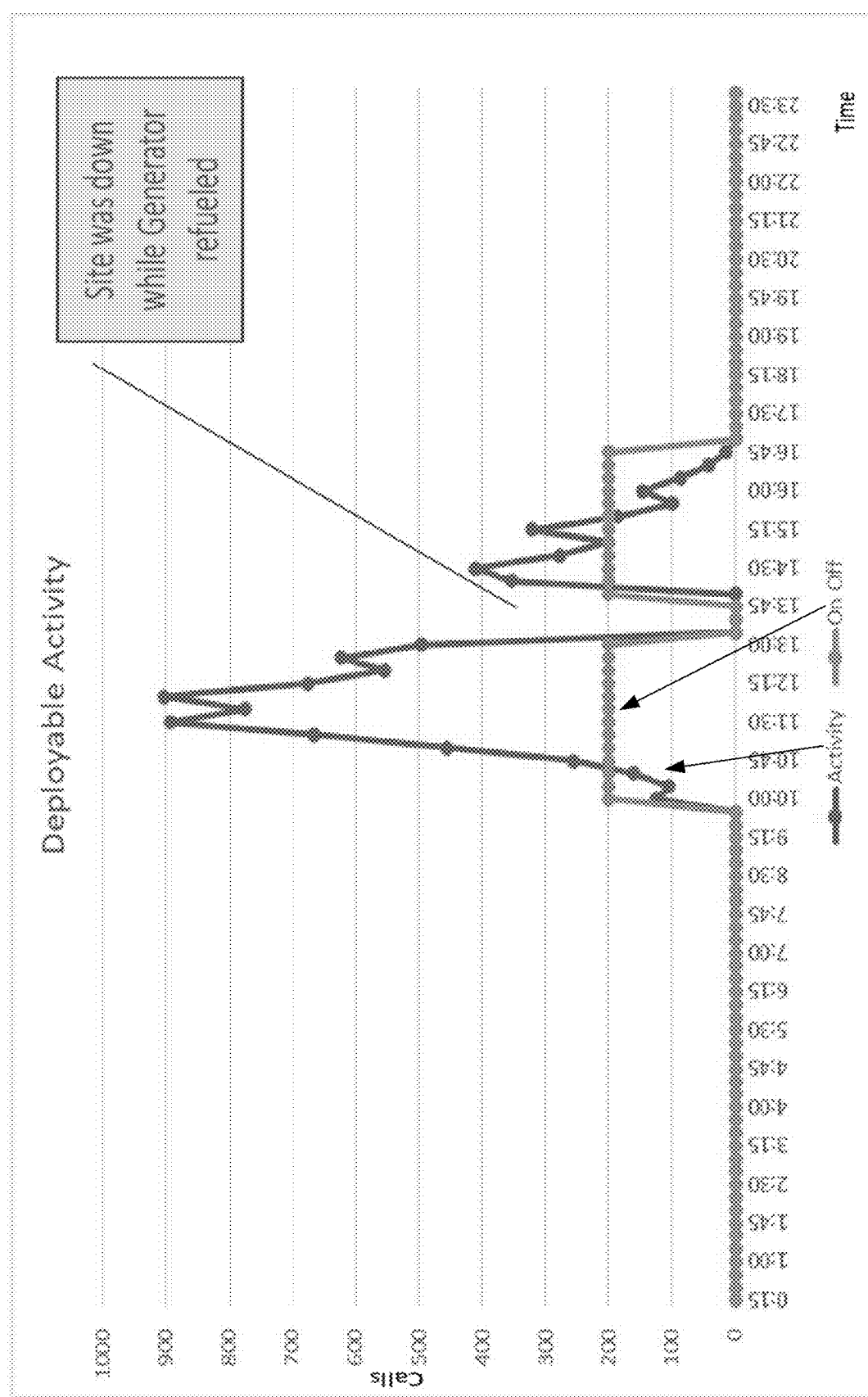
FIG. 2D is a graphical illustration of data associated with an example, non-limiting embodiment of a system functioning within the communication network of FIG. 1 in accordance with various aspects described herein.

FIG. 2D is a block diagram of information 275 of a performance report that can be generated by server 185 (or other devices/functionality as described herein) for a particular area that is associated with a deployable cell site. In this example, the number of calls that were handled by the deployable cell site is shown as a function of time. The deployable cell site(s) can operate on temporary power and/or temporary backhaul, so there are instances where a satellite link can go down and/or a generator can run out of gas. One or more of the embodiments can detect this down-time and can provide notice (or a report) to the entity managing the deployable cell site.

Figure 2E:
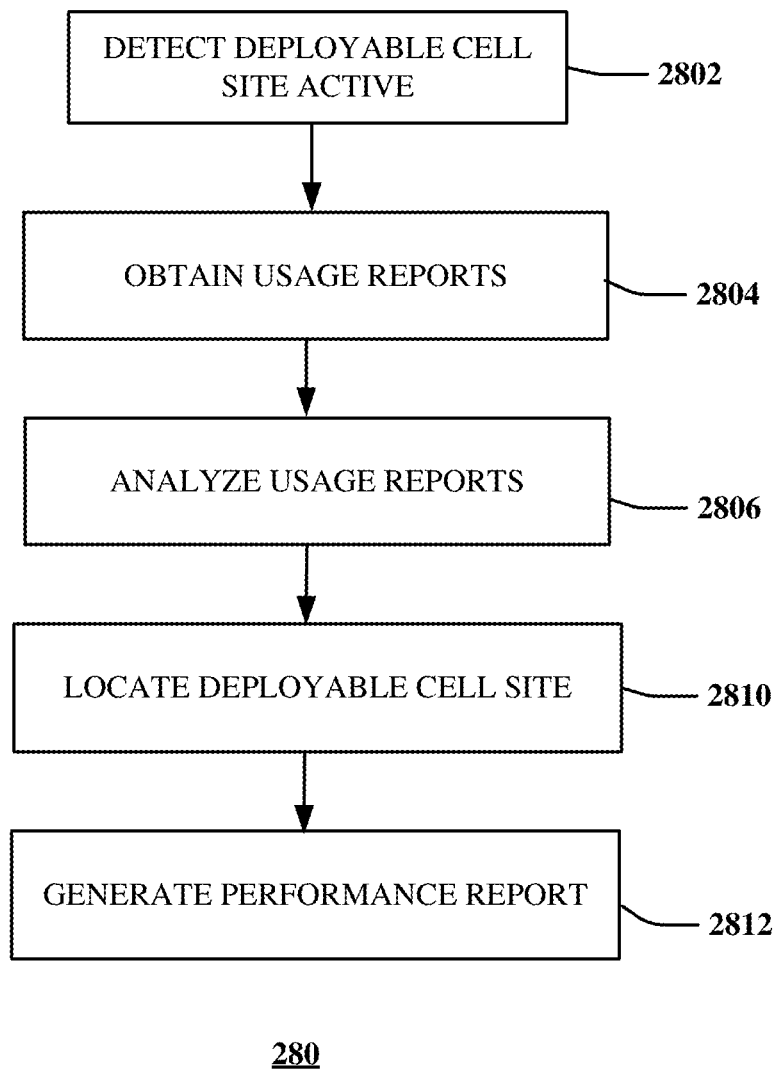
FIG. 2E depicts an illustrative embodiment of a method in accordance with various aspects described herein.

FIG. 2E depicts an illustrative embodiment of a method 280 in accordance with various aspects described herein. Method 280 can be performed by various devices alone or in combination with other devices, which can include being performed in whole or in part in the Cloud.

At 2802, it can be detected or determined that a deployable cell site has become active. This can be done in a number of different ways. For example, identification information provisioned to the deployable cell site (e.g., at a time of purchase) can be registered with a communication service provider, such as utilizing a database for storing identification information for deployable cell sites including ones that are operated by entities other than the communication service provider that is managing the database and/or network. In one embodiment, the determination or detection can be made that the deployable cell site has become active without receiving a notification from the deployable cell site.

At 2804, device usage reports can be obtained and analyzed, which can be generated from device usage data when end user devices connect with a network. As an example, device usage reports can generate information including longitude and latitude data for the end user device when the end user device connects with a particular cell site. The device usage reports can be analyzed at 2806 according to the identification information (or a portion thereof) of the deployable cell site.

At 2810, a location of the deployable cell site can be determined or estimated based on the analysis of the device usage reports and based on network performance data. As an example, RSSI data and triangulation along with the end user device position data can be used to determine or otherwise estimate the location of the deployable cell site. At 2812, a performance report and/or location map can be generated for an area associated with the deployable cell site. In one or more embodiments, the performance report and/or location map is generated for end user devices that obtained or tried to obtain services via the particular deployable cell site.

In one embodiment, a determination or detection can be made that the deployable cell site has become inactive without receiving a notification from the deployable cell site. In one embodiment, method 280 can include transmitting the performance report and/or the location map to a group of communication devices that is operated by the first entity (e.g., the network service provider). In one embodiment, method 280 can include providing access to a graphical user interface that enables selection of a time period and cell sites for generating a revised performance report. In one embodiment, method 280 can include transmitting the performance report and/or the location map to a communication device that is operated by the entity that is not the communication service provider and is managing the deployable cell site. In one embodiment, method 280 can include providing access to a graphical user interface that enables selection of a time period and cell sites for generating a revised performance report.

In one embodiment, the performance report includes a comparison of the deployable cell site to one or more fixed cell sites. In one embodiment, the performance report includes VoLTE accessibility, VoLTE retainability, VoLTE attempts, data accessibility, data retainability, data attempts, average uplink RSSI, downlink throughput, downlink volume, or a combination thereof. In one embodiment, method 280 can include periodic monitoring of the network according to the identification information to detect or determine that the deployable cell site has become active and/or inactive without receiving a notification from the deployable cell site.

In one or more embodiments, AI/ML can be applied to the performance data to predict future events, future parameters and/or future desired actions. For example, the AI/ML can be trained on historical performance information associated with particular conditions/events/disasters/deployable cell sites/etc. and according to an analysis of the current performance information as well as other data such as the deployable cell cite location, capability, and so forth, can predict future effects on the network elements in or near the particular coverage area, future performance parameters in the particular coverage area, and/or future desired actions such as deploying another deployable cell site or adjusting network elements near the particular coverage area. In one embodiment, some or all of the predicted future events, future parameters and/or future desired actions can be included with some or all of the reports that are being generated and distributed. As an example, predicted future events, future parameters and future desired actions that are directly related to the deployable cell site may be provided in a first report that is shared with the entity operating the deployable cell site, while predicted future events, future parameters and future desired actions associated with the deployable cell site and the network elements may be provided in a second report that is shared with individuals of the communication service provider.

In one or more embodiments, the deployable cell site may be owned or operated by a same communication service provider that manages the network, such as to dynamically supplement services in a particular coverage area in response to various situations including disasters, poor performance, scheduled events, maintenance, and so forth.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, software workers or code applets can be utilized to facilitate detecting when one or more deployable cell sites have become active, such as code that runs latent in the background until triggered or called upon by a higher order process. The software workers can be installed or executed at various equipment including in the network core, at edge servers, at the server 180, at cell sites, or other places where detection of deployable cell site activity is possible.

In one or more embodiments, once the software worker(s) detects that a particular deployable cell site has become active and notifies the network server of same (e.g., server 185), then the network server can monitor for identification information (e.g., cell IDs) in device usage reports (e.g., reports from data/information obtained by software on the end user device or otherwise obtained). As an example, device usage reports as described herein can be generated in the network for some or all customer activity, such as when a mobile phone connects with or otherwise talks to a cell site.

In one or more embodiments, the performance report can be user-configurable and can be an e-mail report. In one or more embodiments, the performance report can be based on regions and can include performance data associated with various network elements in addition to any deployable cell sites operating in the region. In one or more embodiments, a selection can be made to filter in or out performance data for particular network elements and/or particular deployable cell sites operating in the region. Other filtering can also be done, which can be user selected, including selecting one or more of particular performance parameters, particular time periods, particular areas, particular named events, particular units, particular graphs to be generated, or combinations thereof. In one or more embodiments, a user can receive a link in the performance report and/or otherwise can be provided access to a GUI that enables the user to make the filtering selections and see the selected information. In one or more embodiments, a communication service provider can be made aware through the techniques described herein of activation of a deployable cell site within a short period of time (e.g., seconds or minutes or hours) as opposed to finding out after several days that a deployable cell site has been operating in a particular area for the several days.

In one or more embodiments, the collection of performance data can be based on various time frames including 15 minutes or other wrap cycles. In one or more embodiments, the performance reports can be distributed or otherwise generated over various time periods and can aggregate performance data over various time periods including minutes, hourly, daily, weekly, monthly. In one or more embodiments, the collection of performance data and/or the generation and/or distribution of performance reports can be adjustable, such as based on user input and/or triggered according to a detected event, such as increasing the frequency of distribution of the performance reports when a network performance parameter is outside of or otherwise does not satisfy a particular threshold. In one or more embodiments, the performance reports and/or the analysis applied to the performance reports (which can include AI/ML analysis that makes predictions as to actions or adjustments to be made) can result in deploying a second or more deployable cell site(s) and/or or adjustments to the already deployed cell site and/or other network elements whose operations effect the services in or adjacent to the coverage area. In one or more embodiments, the analysis of the performance data associated with the deployable cell cite can result in various operational actions or adjustments, such as deploying one or more additional deployable cell sites to the area (or neighboring areas). In one or more embodiments, various factors (in conjunction with or separate from the performance data analysis) can result in operational actions or adjustments such as changing access levels to services provided via the deployable cell site (e.g., initially providing emergency responder devices with cellular services and non-emergency devices with WiFi internet access within particular coverage areas and then adjusting the access so that both cellular services and WiFi Internet services are limited to only emergency responder devices. In one or more embodiments, the deployable cell sites may or may not be subjected to self-optimizing network features that are applied to other network elements/cell sites. Ascertaining the knowledge of the deployables' location will facilitate the development and refinement of additional self-optimization and self-configuration features.

In one or more embodiments, a prediction can be made that a particular deployable cell site will remain at a location for an extended period of time (e.g., two or more days) and additional deployable cell site(s) can then be deployed in proximity as neighbors for facilitating hand-offs of service.

In one or more embodiments, the functionality described herein, including location determination for the deployable cell site and/or performance metric monitoring, can be executed at a data center and/or in the Cloud.

Method 280 and the components described above can be applied in various situations. For example, an emergency event may have occurred (e.g., hurricane, fire, flood, earthquake, train derailment, plane crash, and so forth) where an emergency cellular service (e.g., FirstNet) is disrupted or not available. The deployable cell site, such as a CRD, may be deployed by the emergency responders (or other third party). In this example, no Internet or provider's network LTE may be available so the CRD uses high-speed satellite service to supply Internet to the emergency responder radio thereby enabling emergency responder cellular devices within a mile of the CRD to operate normally, while non-emergency cellular devices within one thousand feet of the CRD are permitted to utilize a WiFi signal such that these non-emergency cellular devices can employ WiFi calling services. In this example, method 280 can detect and locate when and where the CRD has become active, even without receiving a notification from the emergency responder entity, and can monitor and distribute performance information to facilitate managing services in the area (as well as in adjacent areas).

As another example, construction equipment at a construction site may accidentally cut a fiber optic cable to a building which then loses Internet and WiFi service in the building. A CRD may be deployed to a parking lot of the building (e.g., by the building owner, a third party contracted by the building owner, and so forth) and the CRD can be linked to the FirstNet cellular network utilizing onboard antennas of the CRD. An Ethernet cable may be run from the CRD and plugged into a router of the building thereby restoring Internet and WiFi for the building including VoIP services at the building. In this example, method 280 can detect and locate when and where the CRD has become active, even without receiving a notification from the building owner, and can monitor and distribute performance information to facilitate managing services in the building.

As another example, a CRD can be deployed to a remote area where there is limited or no cellular service but work is needed to be done, such as a concert or festival, law enforcement operation, construction of a hospital, and so forth. The CRD can be used to establish a FirstNet cellular site and a WiFi hotspot is provided. The CRD can operate utilizing a generator. In this example, method 280 can detect and locate when and where the CRD has become active, even without receiving a notification from the entity managing the CRD, and can monitor and distribute performance information to facilitate managing services in the remote location.

As another example, a CRD can be deployed to students, a community during a blackout, providing telemedicine in a remote area and so forth. As another example, a CRD can be deployed to drop points in a forest fire which will facilitate firefighters obtaining IAPs, maps, voice call services, emails, texts, and/or logistics requests at the point or scene of the fire. In each of these examples, method 280 can detect and locate when and where the CRD has become active, even without receiving a notification from the entity managing the CRD, and can monitor and distribute performance information to facilitate managing services in the locations, including by way of high speed satellite services.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 280 presented in FIGS. 1, 2A-2E and 3. For example, virtualized communication network 300 can facilitate in whole or in part accessing device usage data that can be generated when end user devices connect with the network; and analyzing the device usage data according to identification information of the deployable cell site, which enables determining or estimating a location of the deployable cell site. In one embodiment, this analysis can be based on device usage reports and network performance data. A performance report and/or location map can be generated for an area associated with the deployable cell site.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
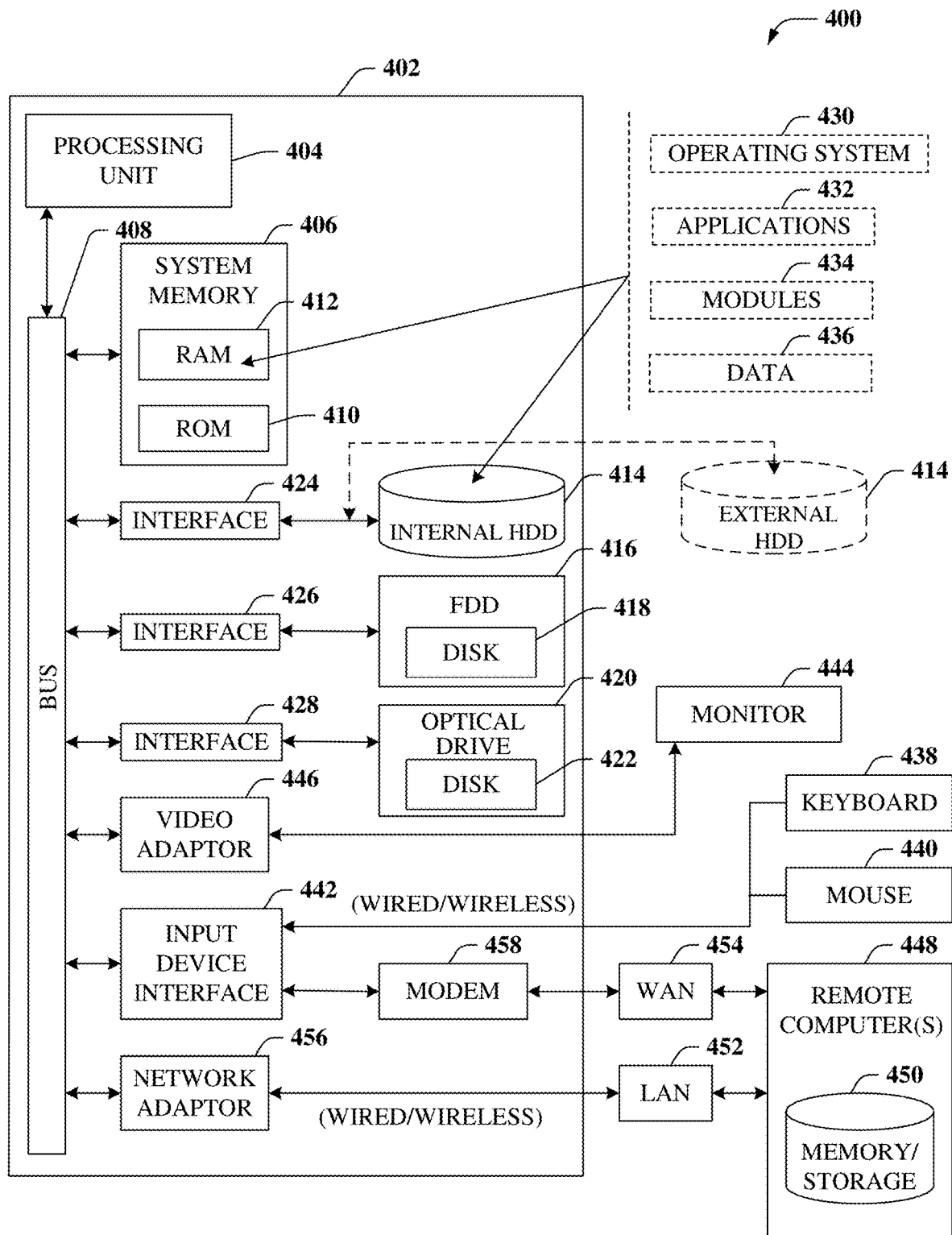
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part accessing device usage data that can be generated when end user devices connect with the network; and analyzing the device usage data according to identification information of the deployable cell site, which enables determining or estimating a location of the deployable cell site. In one embodiment, this analysis can be based on device usage reports and network performance data. A performance report and/or location map can be generated for an area associated with the deployable cell site.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
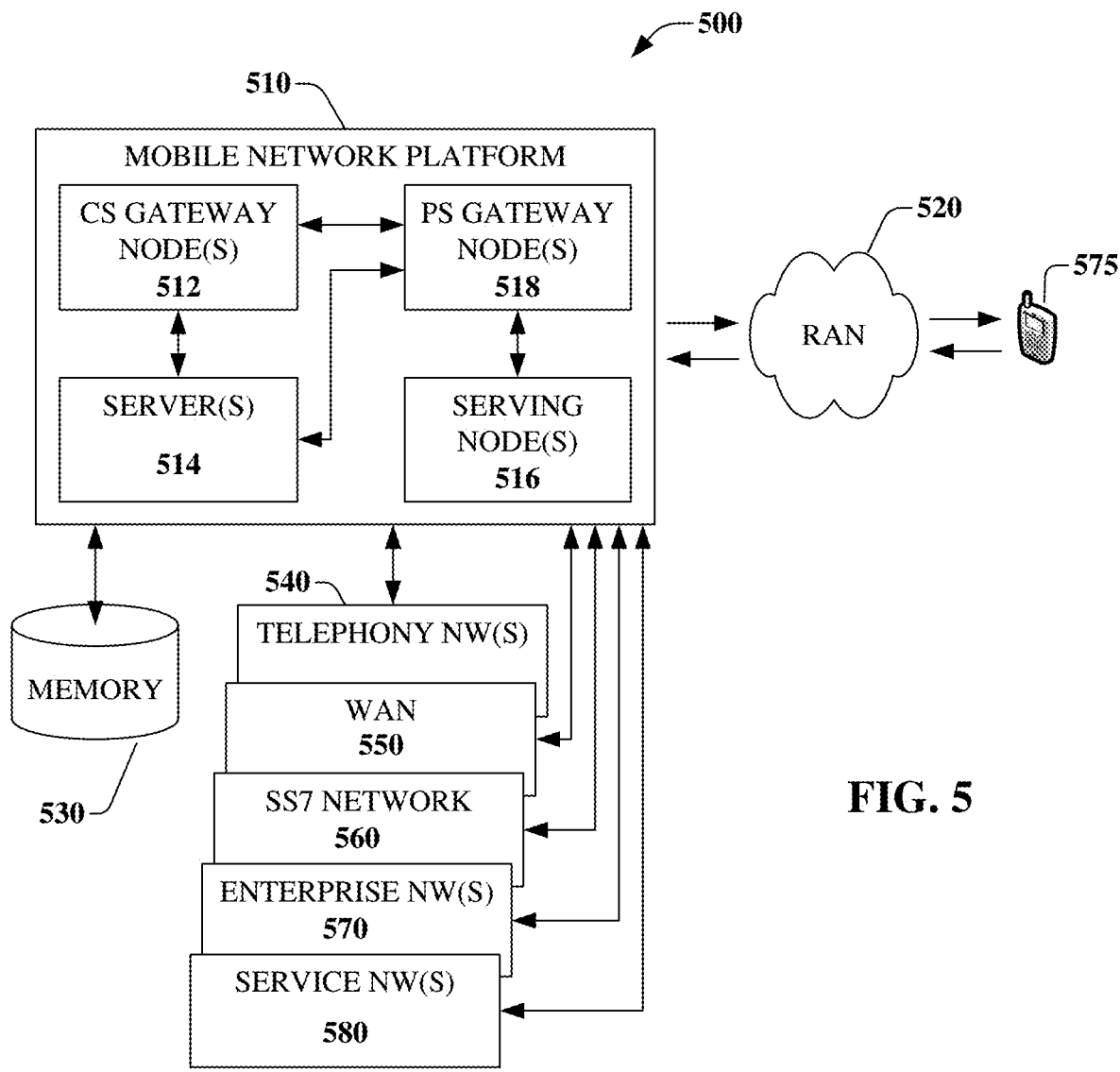
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part accessing device usage data that can be generated when end user devices connect with the network; and analyzing the device usage data according to identification information of the deployable cell site, which enables determining or estimating a location of the deployable cell site. In one embodiment, this analysis can be based on device usage reports and network performance data. A performance report and/or location map can be generated for an area associated with the deployable cell site. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
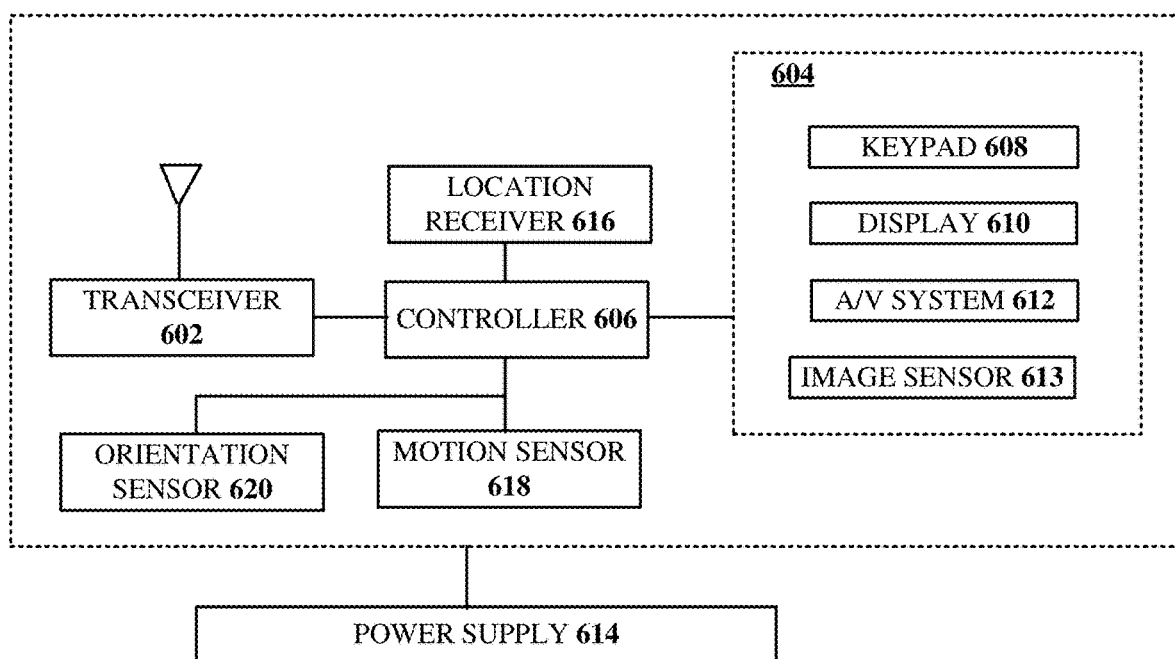
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part accessing device usage data that can be generated when end user devices connect with the network; and analyzing the device usage data according to identification information of the deployable cell site, which enables determining or estimating a location of the deployable cell site. In one embodiment, this analysis can be based on device usage reports and network performance data. A performance report and/or location map can be generated for an area associated with the deployable cell site.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth©. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device operated by a first entity, comprising:
   a processing system including a processor; and
   a memory that stores executable instructions that, when executed by the processing system, facilitate performance of operations, the operations comprising:
   storing identification information for a deployable cell site that is operated by a second entity;
   detecting that the deployable cell site has become active on a network that is operated by the first entity, wherein the detecting that the deployable cell site has become active is based on periodic monitoring of the network according to the identification information without receiving a notification from the deployable cell site;
   accessing device usage reports that are generated from device usage data when end user devices connect with the network;
   performing an analysis of the device usage reports according to the identification information;
   determining a location of the deployable cell site based on the analysis of the device usage reports and network performance data; and
   generating a performance report and location map for an area associated with the deployable cell site.

2. The device of claim 1, further comprising detecting that the deployable cell site has become inactive without receiving a notification from the deployable cell site, wherein the network performance data includes Received Signal Strength Indicator (RSSI) data.

3. The device of claim 1, wherein the determining the location is based on triangulation.

4. The device of claim 1, wherein the operations further comprise transmitting the performance report and the location map to a group of communication devices that is operated by the first entity.

5. The device of claim 4, wherein the transmitting the performance report and the location map includes providing access to a graphical user interface that enables selection of a time period and cell sites for generating a revised performance report.

6. The device of claim 1, wherein the operations further comprise transmitting the performance report and the location map to a communication device that is operated by the second entity.

7. The device of claim 6, wherein the transmitting the performance report and the location map includes providing access to a graphical user interface that enables selection of a time period and cell sites for generating a revised performance report.

8. The device of claim 1, wherein the performance report includes a comparison of the deployable cell site to one or more fixed cell sites.

9. The device of claim 1, wherein the performance report includes VOLTE accessibility, VOLTE retainability, VOLTE attempts, data accessibility, data retainability, data attempts, average uplink RSSI, downlink throughput, downlink volume, or a combination thereof.

10. A method, comprising:
    detecting, by a processing system including a processor, that a deployable cell site that is operated by a second entity has become active on a network that is operated by a first entity, wherein the detecting that the deployable cell site has become active is based on periodic monitoring of the network according to identification information for the deployable cell site without receiving a notification from the deployable cell site;
    receiving, by the processing system, a performance report for an area of the network associated with the deployable cell site, wherein the performance report is received from a network server of the network, wherein the performance report is generated according to an identification of a location of the deployable cell site based on an analysis of device usage reports and network performance data, wherein the device usage reports are generated from device usage data when end user devices connect with the network; and
    presenting, by the processing system, the performance report.

11. The method of claim 10, comprising providing access to a graphical user interface that enables selection of a time period and cell sites for generating a revised performance report.

12. The method of claim 10, wherein the determining the location of the deployable cell site is based on triangulation.

13. The method of claim 10, comprising receiving registration information for the deployable cell site that includes a USID, CellID, and PCI.

14. The method of claim 13, wherein the periodically monitoring the network is conducted according to at least one of the USID, the CellID, and the PCI to detect whether the deployable cell site has become active.

15. The method of claim 10, wherein the performance report includes VOLTE accessibility, VOLTE retainability, VOLTE attempts, data accessibility, data retainability, data attempts, average uplink RSSI, downlink throughput, downlink volume, or a combination thereof.

16. The method of claim 10, wherein the network performance data includes Received Signal Strength Indicator (RSSI) data.

17. A non-transitory machine-readable medium, comprising executable instructions that, when executed by a processing system including a processor operated by a first entity, facilitate performance of operations, the operations comprising:

detecting that a deployable cell site that is operated by a second entity has become active on a network that is operated by the first entity, wherein the detecting that the deployable cell site has become active is based on periodic monitoring of the network according to identification information for the deployable cell site without receiving a notification from the deployable cell site;

accessing device usage reports that are generated from device usage data when end user devices connect with the network;

performing an analysis of the device usage reports according to the identification information for the deployable cell site;

determining a location of the deployable cell site based on the analysis of the device usage reports and network performance data; and generating a performance report for an area associated with the deployable cell site.

18. The non-transitory machine-readable medium of claim 17, wherein the network performance data includes Received Signal Strength Indicator (RSSI) data, and wherein the determining the location is based on triangulation.

19. The non-transitory machine-readable medium of claim 17, wherein the operations further comprise transmitting the performance report to a group of communication devices that is operated by the first entity, and wherein the transmitting the performance report includes providing access to a graphical user interface that enables selection of a time period and cell sites for generating a revised performance report.

20. The non-transitory machine-readable medium of claim 17, wherein the performance report includes a comparison of the deployable cell site to one or more fixed cell sites.

\* \* \* \* \*